United States Patent [19]

Hallberg

[11] Patent Number: 5,095,950
[45] Date of Patent: Mar. 17, 1992

[54] FLUID MIXING APPARATUS WITH PROGRESSIVE VALVE MEANS

[76] Inventor: John E. Hallberg, 517 Pine Gate Road, Peachtree City, Ga. 30269

[21] Appl. No.: 685,908

[22] Filed: Apr. 16, 1991

[51] Int. Cl.⁵ ............................................. G05D 11/03
[52] U.S. Cl. ................................... 137/88; 137/625.17
[58] Field of Search ............................ 137/88, 625.17

[56] References Cited

U.S. PATENT DOCUMENTS

| | | | |
|---|---|---|---|
| 1,949,300 | 2/1934 | Fitter | 137/625.17 |
| 3,297,051 | 1/1967 | Church | 137/625.17 |
| 4,765,356 | 8/1988 | Hallberg | 137/88 X |

Primary Examiner—Robert G. Nilson
Attorney, Agent, or Firm—Hopkins & Thomas

[57] ABSTRACT

An apparatus for combining fluids having a piston assembly which controls both the flow rate and the mixture ratio. The piston assembly is carried in a housing having two circular inlet ports and an outlet or mixing chamber. The housing and piston assembly also define first and second piston chambers. A first passageway permits the communication of the dominant gas port and the one piston chamber and a second passageway similarly permits the communication of the mixing chamber and the other piston chamber. The relative pressures in the first and second piston chambers influence the axial position of the piston which controls flow rate. Rotation of the piston controls the mixture ratio. A gate portion of the valve element attached to the piston stem is angled. The angled gate portion and circular inlet ports provide a progressive valving, which minimizes "hunting" of the apparatus when used with a control means in a feedback loop.

17 Claims, 5 Drawing Sheets

FLUID MIXING APPARATUS WITH PROGRESSIVE VALVE MEANS

TECHNICAL FIELD

This invention relates to an apparatus and method for mixing fluids and is more particularly concerned with a piston-operated mixer which receives fluids, for example air and propane gas, and combines them at a designated ratio. The mixer further allows the fluids to be mixed and delivered in amounts depending upon demand.

In the Past, various systems have been employed for mixing air and propane gas for use as a replacement for natural gas. Such systems are described in *Handbook Butane-Propane Gases.* 4th Ed., 1962. One such system uses mechanically interlocked, sliding valves which automatically open or close as demand increases or decreases, or which can be manually set. A blower or compressor draws the mixed gas from a mixing chamber and forces it through distribution piping. The mixing apparatus, illustrated at page 267, employs a complex combination of diaphragms and pistons to control flow. Other systems, similarly described, include a venturi-mixer and an orifice meter ratio control system.

Such mixing systems are commercially available from Eclipse, Inc. and Selas Corporation of America. The Eclipse device includes two cones which control the air and propane gas quantities, respectively. This system includes a diaphragm which senses pressure imbalance and, in turn, activates a linkage that changes the respective orifice areas.

The Selas system also includes a diaphragm, which is attached to a non-rotatable piston. Gas pressure on the respective sides of the diaphragm causes the diaphragm to be raised or lowered, thus raising or lowering the piston and so controlling the quantity of the delivered mixture. A rotatable "sleeve" surrounds the piston and can be set in various positions to achieve a desired air/propane ratio.

Each of the above-referenced systems generally suffer from being complicated and less reliable and efficient than is desired.

U.S. Pat. No. 4,765,356 of Hallberg entitled "METHOD AND APPARATUS FOR MIXING FLUIDS" discloses a mixing arrangement having a housing defining a mixing chamber, first and second inlet chambers in fluid communication with the mixing chamber, valve means for controlling the flow of fluids from the inlet chambers into the mixing chamber, and actuating means for actuating the valve means. While an apparatus according to '356 of Hallberg generally works quite well, it nonetheless suffers somewhat from an undesirable amount of "hunting" back and forth of the valve means as the actuating means functions in a feedback loop to maintain a uniform mixed gas to the user.

Accordingly, it can be seen that a need yet remains for a method and apparatus for mixing fluids, particularly air and a combustible gas, which is simple, reliable and efficient in operation and which, when automatically controlled, avoids an undesirable amount of hunting of its valve means. It is to the provision of such a method and apparatus that the present invention is primarily directed.

SUMMARY OF THE INVENTION

Briefly described, the present invention comprises a fluid mixing apparatus that includes a housing having two inlet ports communicating with two inlets or inlet chambers and an outlet or a mixing chamber communicating with the inlet ports. One inlet port delivers a dominant, or combustible gas, such as propane gas, and the second inlet port delivers air. The gasses are delivered to the mixing chamber, or outlet, where they are combined and delivered to the user. The quantity of the mixed gas delivered through the outlet is controlled by the axial position of a floating piston assembly. A top portion of the piston assembly and the housing define first and second piston chambers, with the pressures in the piston chambers acting to influence the axial position of the piston assembly. A first passageway permits fluid communication between the dominant gas inlet chamber and the first piston chamber. A second passageway permits fluid communication between the mixing chamber and the second piston chamber. These passageways effectively equalize the gas pressures between the first piston chamber and the dominant gas inlet chamber, and between the second piston chamber and the mixing chamber. A difference in the products of the gas pressure and the exposed piston area of each piston chamber causes the piston to move axially in one direction or another.

The position of the piston assembly eventually tends to equalize or maintain an axial position within a small range of movement, thereby delivering a desired quantity of mixed gas to the user. The piston assembly has a valve element fixedly attached to one end, which valve element is selectively operable with the piston assembly to restrict either of the first and second inlet ports associated with the first and second inlets, respectively, as the piston is rotated within the housing. The ratio of the two inlet gasses delivered to the mixing chamber is controlled by the rotational position of the piston.

Preferably, the inlet ports are round and the valve element includes a gate portion having side edges which are each oriented at an angle with respect to an axis extending through the mixing chamber. Preferably, both side edges lie in a common plane and are arranged so that the gate portion tapers from a maximum adjacent the piston to a minimum distal therefrom. The combination of round inlet ports and a tapered gate portion provides a progressive valve means. For example, as the gate portion is rotated and begins to uncover one of the round inlet ports, the area so uncovered increases at a rate which itself increases geometrically until half of the port is uncovered. Further rotation causes the round inlet port to be uncovered at a rate that decreases geometrically until the entire port is uncovered (covering of the ports occurs in an analogous fashion). This covering and uncovering of the inlet ports in a progressive manner in response to rotation of the gate portion allows the actuator means, which typically is part of a feedback loop, to more accurately control the relative amounts of air and combustible fuel being mixed in the mixing chamber while avoiding excessive hunting.

In addition to the progressive operation provided by the round inlet ports, progressive operation is provided by the angled side edges. This is so because in addition to the back and forth rotation of the gate portion by the actuator means, the valve element, including the gate portion, is moved back and forth axially as the Piston "floats" in the piston chamber in response to pressure differentials in the first and second piston chambers. By being angled, the side edges progressively cover and uncover the inlet ports as the gate portion is rotated, is moved axially, or both. This tends to reduce undesirable variations in the mixture ratio of the two gasses due to hunting of the piston assembly as the piston assembly operates to balance demand with the quantity of mixed gas delivered.

Preferably, the apparatus includes a control device used in conjunction with the valve element for automatically rotating the valve element upon receiving an electric signal from a BTU measuring device.

In operation, the apparatus is disposed to receive two input lines which are regulated to deliver their respective gasses at essentially identical pressures. As stated, the piston assembly either is manually or automatically rotated to determine mixed gas ratios. As the demand downstream of the outlet increases, a pressure drop in the second piston chamber causes the floating piston to rise, thereby allowing more gasses from both inlet lines to be mixed and delivered to the user. The axial movement of the piston stabilizes eventually as demand becomes uniform, thus delivering the necessary quantity of mixed gas to the user. The progressive nature of the covering and uncovering of the inlet ports tends to minimize "hunting" of the control device.

Accordingly, it is an object of the present invention to provide an apparatus for mixing fluids which is inexpensive to manufacture, durable in structure, and efficient in operation.

Another object of the present invention is to provide an apparatus for mixing fluids in which the ratio of mixed fluids can be accurately and easily controlled while avoiding excessive hunting.

Another object of the present invention is to provide an apparatus for mixing fluids which delivers a desired quantity of mixed gas to a user, depending upon demand.

Another object of the present invention is to provide an apparatus which utilizes a minimum number of moving parts and requires little maintenance.

Another object of the present invention is to provide an apparatus for mixing fluids which delivers mixed fluids at a selected ratio and quantity accurately and efficiently.

Another object of the present invention is to provide an apparatus for mixing fluids which does not include any diaphragms.

Another object of the present invention is to provide an apparatus for mixing fluids in which the piston contained therein remains in close tolerance with the housing, while not touching the bore of the housing.

Another object of the present invention is to provide an apparatus for mixing fluids which does not include the temperature and design pressure restrictions as those devices of the prior art.

Another object of the present invention is to provide an apparatus for mixing fluids which does not require piston rings.

Other objects, features, and advantages of the present invention will become apparent from the following description when taken in conjunction with the accompanying drawings wherein like characters of reference designate corresponding parts throughout the several views.

DETAILED DESCRIPTION OF THE PREFERRED EMBODIMENT

Figure 1:
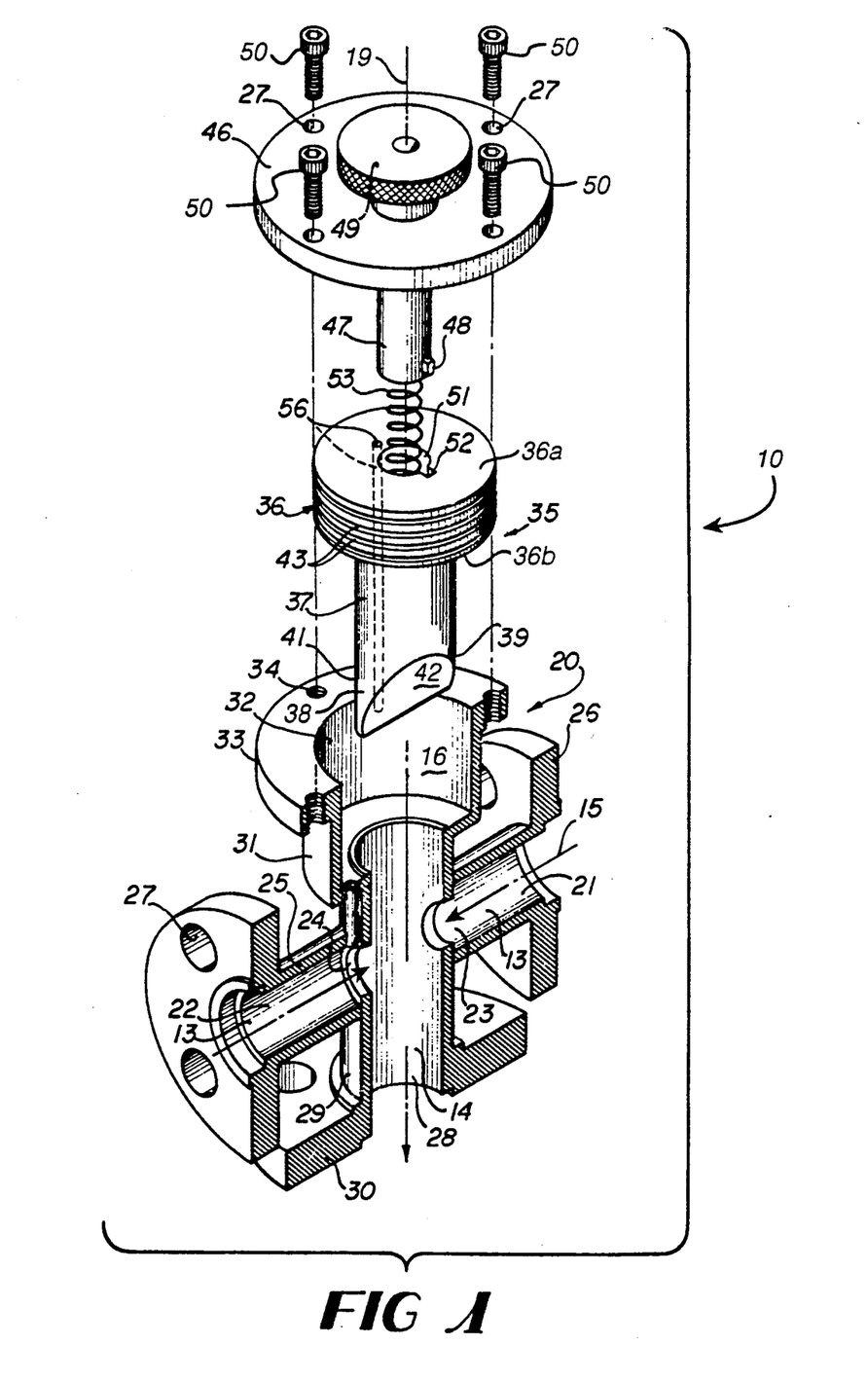
FIG. 1 is an exploded perspective view of an apparatus according to a preferred form of the Present invention in partial cross-section.

Referring in detail to the embodiment chosen for the purpose of illustrating the present invention, FIG. 1 shows a mixing apparatus 10 according to a Preferred form of the invention. The apparatus 10 includes a cross-shaped housing member 20 having a vertical axis 19 which defines an air inlet chamber 21 and a propane, or dominant gas, inlet chamber 22. The inlet chambers 21 and 22 are defined by interior circumferential walls 13 of arms 25 of housing 20. The inlet chambers 21 and 22 are ported by identical inlet ports 23 and 24, respectively. The inlets 21 and 22 and inlet Ports 23 and 24 preferably are aligned along a horizontal axis 15, although the invention is operable with various alignments of inlets 21 and 22 and inlet ports 23 and 24. Each port 23 and 24 preferably is arcuately-shaped, such as the "circular" shape shown in the figures. The ports are formed by creating a cylindrical bore along axis 15 intersecting cylindrical wall 14. Thus, the ports are not truly circular, but are shaped as the projection of a circle or cylinder onto a larger cylinder (the larger cylinder defining the mixing chamber, as will be described in more detail below).

Figure 3:
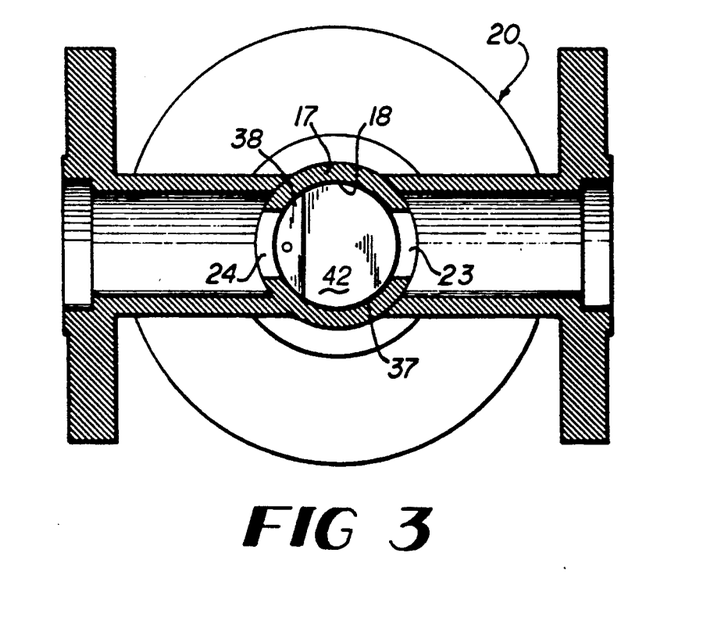
FIG. 3 is a cross-sectional view of the apparatus of FIG. 1 taken along lines 3—3 of FIG. 2.

Each arm 25 has a flange 26 containing bores or boltholes 27, through which unshown bolts pass to allow the flanges 26 of the apparatus to be secured to corresponding flanges of inlet lines or pipes. Such securing of the flanges is generally known in the art, and numerous known methods can be utilized. Housing member 20 also includes an arm 29 perpendicular to arm 25 and having an interior circumferential wall 14 that defines a cylindrical mixing chamber or lower housing 28. Arm 29 includes flange 30 at one end thereof, similar to flanges 26, which includes bolt holes 27 and is secured to an unshown corresponding flange of an outlet line by bolts or other commonly known suitable means. Housing member 20 also includes an arm or upper housing 31 opposite arm 29 perpendicular to arm 25 and having an interior circumferential wall 16 which defines a main cylindrical piston chamber 32. An annular collar 17 is disposed between and joins upper housing 31 and mixing chamber or lower housing 28, as best shown in FIG. 3. Collar 17 defines an inner surface 18 coextensive with the inner surface of cylindrical wall 14.

Figure 2:
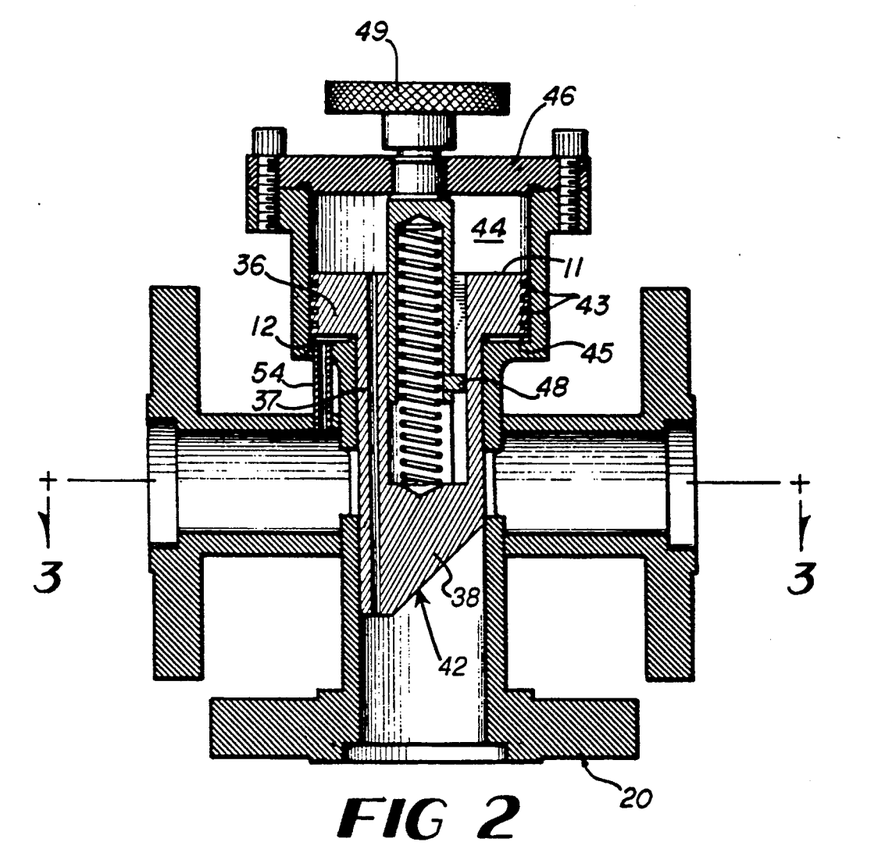
FIG. 2 is a cross-section view of the apparatus of FIG. 1 showing a piston assembly portion thereof in a lowered position.
Figure 4:
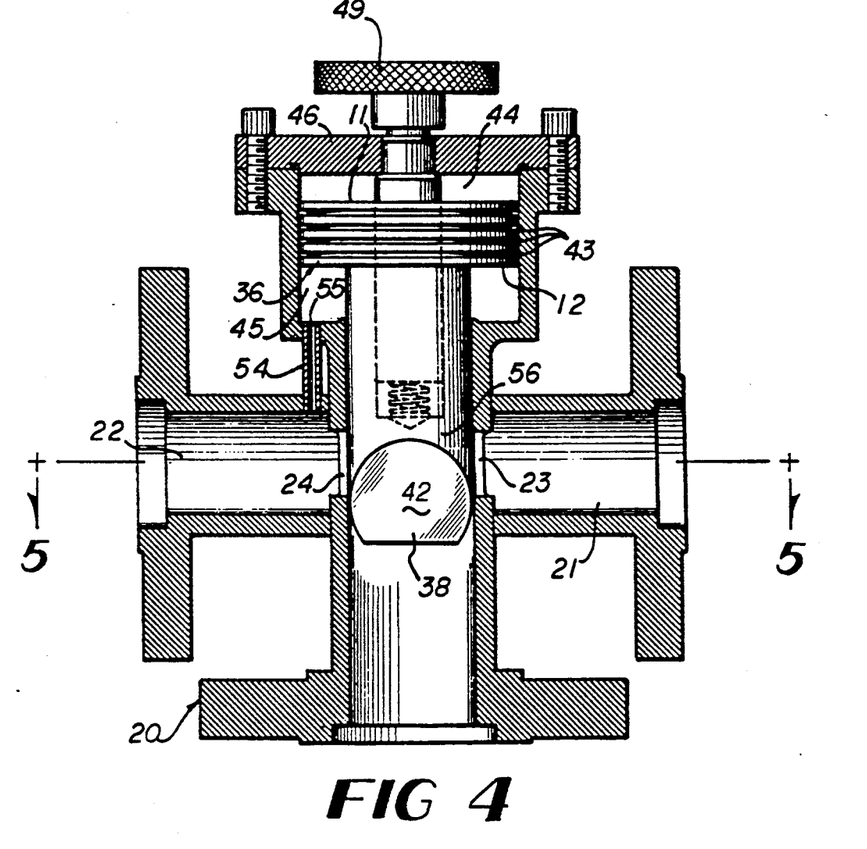
FIG. 4 is a cross-sectional view of the apparatus of FIG. 1 showing a piston assembly portion thereof in an intermediate position.
Figure 5:
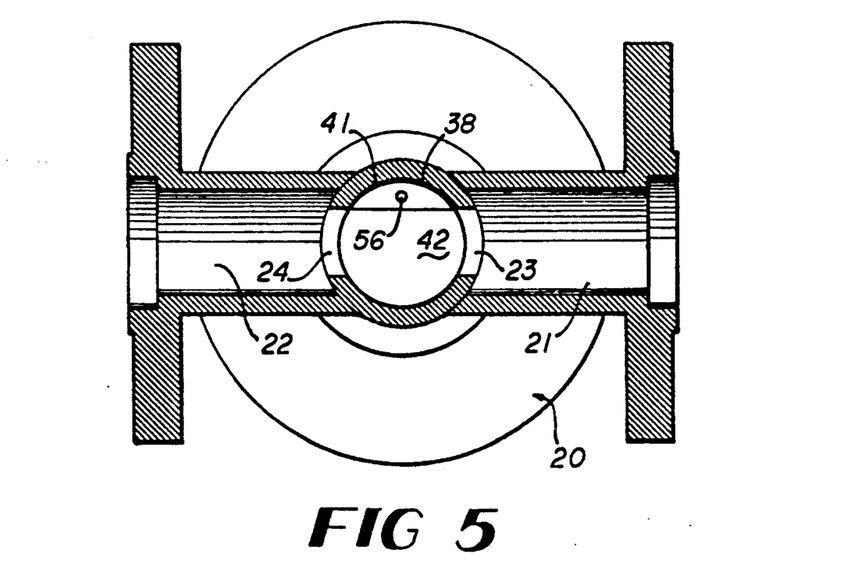
FIG. 5 is a cross-sectional view of the apparatus of FIG. 1 taken along lines 5—5 of FIG. 4 and showing a gate portion in a first orientation.
Figure 6:
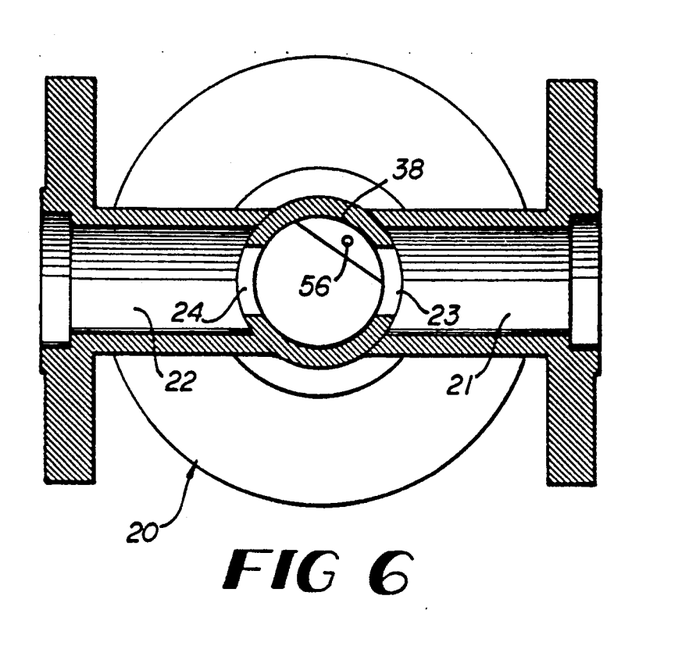
FIG. 6 is a cross-sectional view similar to FIG. 5 showing the gate portion of the apparatus in a second orientation.

A cap flange 33 is positioned on upper housing 31 and includes internally threaded bores 34. A piston assembly denoted generally by the numeral 35 is slidably received in piston chamber 32. Piston assembly 35 includes a cylindrical piston head 36, a smaller diameter cylindrical piston stem 37, and a gate 38, which gate 38 will be described in more detail below. Piston assembly 35 is slidably received in cylindrical piston chamber 32, and piston stem 37 thereby extends into cylindrical mixing chamber 28 to a distance so that a lower portion 39 of piston stem 37 extends slightly below the lower periphery of ports 23 and 24 when piston assembly 35 is in its lowermost axial position, as shown in FIG. 2. While piston stem 37 slides axially within housing member 20, stem 37 is also received into mixing chamber 28 so that both ports 23 and 24 are effectively closed off when piston assembly 35 is in its lowermost axial position. Gate 38 is formed of lower portion 39 of piston stem 37. Gate 38 is generally arcuate shaped, with a circumferential, cylindrical outer surface 41 concentric with the outer surface or circumference of piston stem 37, and a flat, angled undersurface 42. Since side surface 41 of gate 38 follows the circumference of piston stem 37, gate 38 closes off either of ports 23 or 24 when gate 38 is disposed adjacent to one or the other of ports 23 and 24. The size of gate 38 is such that with piston assembly 35 positioned at or above its intermediate axial position shown in FIG. 4, gate 38 can be rotated to two different orientations on either side of and between ports 23 and 24 so as not to restrict either of the ports 23 and 24. For example, FIG. 5 depicts gate 38 in an orientation which permits unrestricted fluid flow from both ports 23 and 24, respectively. Likewise, gate 38 can be oriented so as to incrementally and progressively close off or restrict either of ports 23 and 24. FIG. 6 depicts gate 38 turned slightly clockwise from its position shown in FIG. 5, so that gate 38 partially restricts fluid flow through port 23. Of course, for gate 38 to restrict either of ports 23 or 24, piston assembly 35 must be disposed axially in a position so that gate 38 is adjacent to ports 23 and 24, an example of which is shown in FIG. 4. FIG. 2 shows stem 37 and gate 38 (in phantom lines) rotated so as to completely close off port 24, with gate 38 (and piston 35) in the lowermost axial position, as discussed above.

Referring now to FIGS. 8A-8D, the details of gate portion 38 of the valve element will be discussed. As shown in the figures, gate 38 is formed of a lower portion 39 of the piston stem 37. The piston stem is cylindrical and the gate portion is formed by removing a portion of the cylinder along a plane oriented at an angle 71 of 45° from a plane 72 which is normal to the cylinder (and axis 19). Additional material below plane 72 is removed from the cylinder so that a foot indicated at 73 is formed at a lowermost portion of gate 38. Foot 73 is planar and perpendicular to axis 19. As a result of this construction, undersurface 42 comprises a portion of an ellipse, designated herein a semi-ellipse 74. Semi-ellipse 74 has the shape of a proper ellipse throughout, excepting for its intersection with foot 73.

The elliptical edge defined by semi-ellipse 74 along the outer surface 41 of gate 38, when viewed from the side as shown in FIG. 8-B, appears as a line oriented at a 45° angle with respect to horizontal. This is the orientation of the gate 38 that one of the inlet ports would "see" as the gate is brought adjacent to one of the ports. Thus, while the side edges 76 and 77 of the semi-ellipse 74 are not actually linear in a true geometric sense, for purposes of acting as a progressive valve closure to cover and uncover the inlet ports, the side edges 76 and 77 can be considered to be generally linear as shown in FIG. 8-B.

The head 36 of piston assembly 35 includes parallel, spaced channels 43, which together form a labyrinth seal to essentially prevent the communication of fluids between the second or upper chamber 44 and first or lower chamber 45. This type of seal is commonly known and utilized in applications which employ a piston. The head 36 of piston assembly 35 is larger than piston stem 37, as depicted in FIG. 1. Piston head 36 is received in piston chamber 32 in close tolerance, but still easily moves axially. Piston head 36 includes a radially disposed, flat upper surface 36a and a radially disposed flat lower surface 36b. Piston stem 37 is attached to and concentrically disposed in relation to piston head 36 as shown in FIGS. 1 and 4. Piston head 36 divides main piston chamber 32 into an upper piston chamber 44 and a lower piston chamber 45 as shown in FIG. 4. Consequently, when piston assembly 35 moves upwardly, or toward cap flange 33, the volume of upper piston chamber 44 decreases and the volume of lower piston chamber 45 increases. When piston assembly 35 moves downwardly, or toward ports 23 and 24, the volume of upper piston chamber 44 increases and the volume of lower piston chamber 45 decreases.

A housing cap 46 journals an actuator 47 which has two ends, and which includes a key 48 attached to its lower end. The opposite end of actuator 47 is fixedly secured to actuator knob 49, so that actuator 47 can be rotated by turning the knob 49 either clockwise or counterclockwise. Cap 46 also includes bores 27 arranged adjacent to its circumference and passing through cap 46 as shown in FIG. 1. Cap 46 is mounted to cap flange 33 of housing member 20 by passing threaded bolts 50 through bores 27 of cap 46 and into internally threaded bores 34 of cap flange 33. Other commonly known methods of mounting may also be employed, as earlier described.

As shown in FIG. 2, when the cap 46 is mounted onto flange 33, actuator 47 extends into piston channel 51 of piston assembly 35, so that the key 48 is axially received into a guide or keyway 52. In operation, therefore, piston assembly 35 moves axially along longitudinal axis 9 of actuator 47 but cannot rotate about longitudinal axis 9 without the rotation of actuator 47 as well because of the presence of key 48 in keyway 52. Extending from the lower end of actuator 47 is a resilient means or spring 53 which also is received in piston channel 51. Spring 53 acts as a dampener to inhibit unrestricted, upward axial movement of piston assembly 35. Because actuator 47 is slidably received in channel 51 of piston assembly 35 and is smaller in cross-sectional area than piston stem 37, the surface area of surface 36a of piston head 36 which is exposed to upper piston chamber 44 is greater than the surface area of the lower surface 36b of piston head 36 which is exposed to lower piston chamber 45.

A tube 54 defines a passageway 55 and connects the dominant gas inlet 22 to lower piston chamber 45, thus essentially equalizing the relative gas pressures in inlet 22 and lower piston chamber 45. Another passageway 56 extends through and is defined by piston assembly 35 along its longitudinal axis, including through piston head 36, stem 37, and gate 38, so that when piston assembly 35 is received in housing member 20, passageway 56 connects mixing chamber 28 and upper piston chamber 44. Thus, the relative gas pressures in upper piston chamber 44 and in mixing chamber 28 are essentially equalized.

In operation, the amount of mixed gas delivered to the mixing chamber 28, and therefore to the user, is determined by the axial position of piston assembly 35 relative to ports 23 and 24. As discussed earlier, the gas pressures in inlets 21 and 22 are regulated so that they are equal. When a user initiates gas demand, the pressure in mixing chamber 28 initially drops, causing an initial corresponding pressure drop in passageway 56 and also in upper piston chamber 44. When the pressure in upper piston chamber 44 drops sufficiently so that the force exerted thereby onto upper surface 36a of piston head 36 exposed to upper piston chamber 44 is less than the force exerted on lower surface 36b of head 36 exposed to lower piston chamber 45, piston assembly 35 is caused to move upwardly, allowing more fluid flow through ports 23 and 24, and into mixing chamber 28.

This phenomenon continues until piston assembly 35 stabilizes within a small range of axial movement. In practice, piston assembly 35 does not remain at a truly fixed axial position, but is adjusted by the relative pressures in chambers 44 and 45, respectively, upwardly or downwardly within a small range of axial movement. The fluid flow through mixing chamber 28 remains essentially constant, however, within the required parameters necessary for the application of the invention.

Spring 53 is not designed to itself control the axial position of piston assembly 35 but is only intended to dampen the upward movement of piston assembly 35 should the pressure in upper piston chamber 44 drop quickly and significantly.

Should the demand again increase, the pressure in upper piston chamber 44 again decreases, likewise causing piston assembly 35 to move upwardly, exposing more of the outlet ports 23 and 24 and allowing more gasses to enter mixing chamber 28. When demand decreases, the pressure in upper piston chamber 44 increases relative to the pressure in lower piston chamber 45, causing the axial position of piston assembly 35 to be lowered, closing off portions of ports 23 and 24, respectively. Thus, demand for gas, which is controlled by the user, controls the amount of mixed gas delivered by the piston operated mixer.

The ratio of the gasses delivered is controlled by rotating piston assembly 35 so that gate 38 partially covers either port 23 or port 24. This can be done by manually turning knob 49, which causes actuator 47 to turn. Since key 48 is engaged in keyway 52, piston assembly 35 turns along with and to the same degree as knob 49. Thus, gate 38, which is fixed to piston stem 37, can be manually, selectively adjusted to control the mixed gas ratio.

Figure 7:
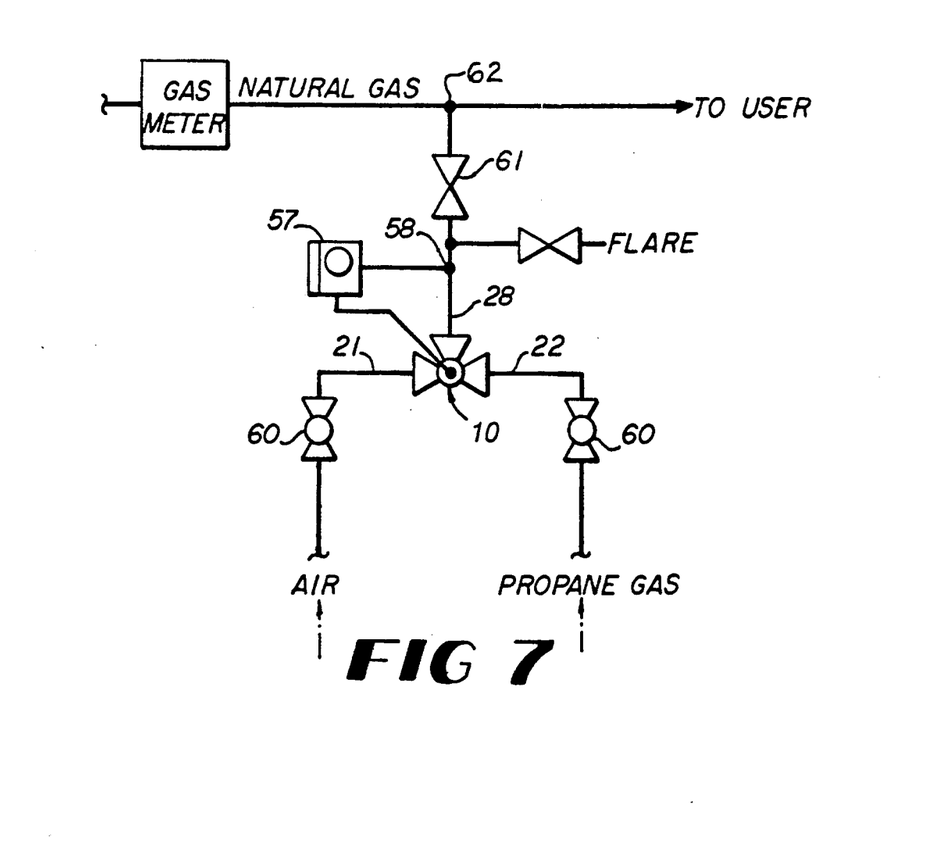
FIG. 7 is a schematic illustration of the apparatus of FIG. 1 shown connected to a natural gas supply line.
Figure 8A:
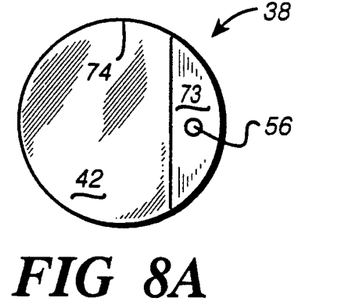
FIGS. 8A-8C are bottom, side, and front views of a valve element portion, including a gate portion, of the apparatus of FIG. 1.
Figure 8B:
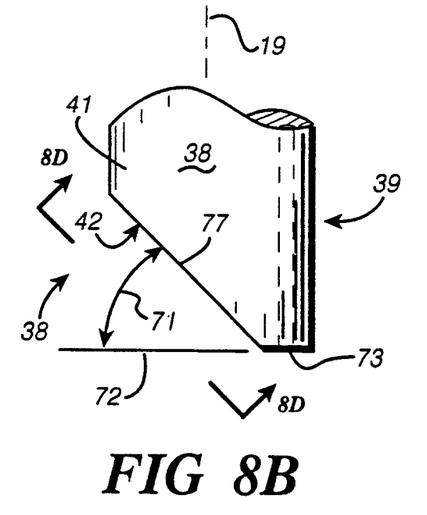
Figure 8C:
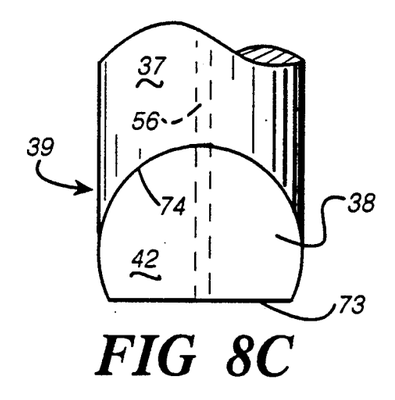
Figure 8D:
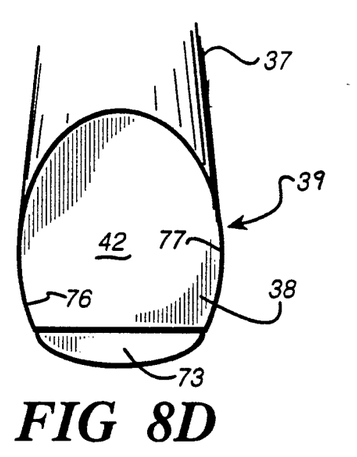
FIG. 8D is a view of the valve element portion of FIG. 8A, taken along a line 45° from the bottom view of FIG. 8A.

Preferably, an apparatus such as a solid state controller, commonly known in the art, is attached to actuator 47 in place of knob 49 to automatically rotate, or turn, piston assembly 35, as described earlier. FIG. 7 shows in schematic illustration easily understood by those skilled in the art the preferred incorporation of the present invention with natural gas service to a user. As discussed earlier, when natural gas service to a user is interrupted, the user can switch from natural gas service to a propane/air mixture by valve 62, which valve 62 can be of any type of three-way valves commonly known in the art. The propane/air mixture is accomplished by combining these gases in the piston-operated mixer 10. The pressure of the inlet compressed air and the pressure of the inlet propane gas are controlled by regulators 60, so as to be identical. The compressed air and propane gas pass through their respective regulators 60 and into the piston-operated mixer 10 through inlets 21 and 22, as the case may be. The mixed gas is then delivered through lower housing, outlet or mixing chamber 28. Controller 57 attached to the piston-operated mixer 10 receives an electric signal from a BTU measuring device 58 such as a gavitometer, calorimeter or a Wobbe Index Meter, which samples the mixed gas on the outlet side of the piston-operated mixer 10. These measuring devices are quite well known in the art, as is controller 57, and are not further described in detail here. The measuring device 58 samples the mixed gas, determines the BTU content thereof and sends an electrical signal (commonly in the 4 to 20 milliamp range) to controller 57. Controller 57 then automatically adjusts the rotation of piston assembly 35 to effect the desired mixed gas ratio. This, in turn, directly affects the BTU content of the mixed gas. Therefore, the BTU content of the mixed gas can be controlled easily and efficiently in such a feedback loop. The gas then passes through valves 61 and 62 to the user.

Figure 9A:
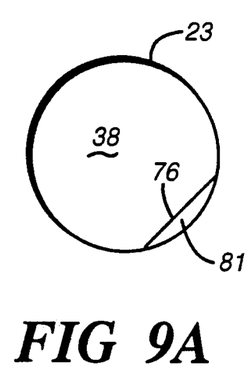
FIGS. 9A-9C are schematic illustrations of an inlet port of the apparatus of FIG. 1 being uncovered progressively.
Figure 9B:
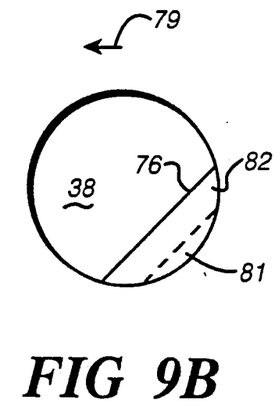
Figure 9C:
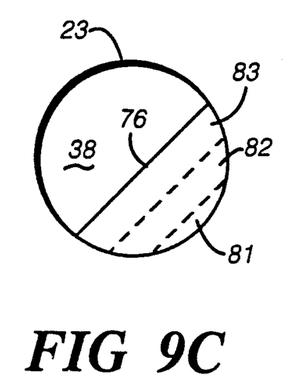

FIGS. 9-A through 9-C depict the covering (or uncovering) of an inlet port, such as inlet port 23, by gate 38 with angled side edges. FIG. 9-A shows inlet port 23 as it is beginning to be uncovered by gate 38, with side edge 76 of the semi-ellipse 74 extending across a portion of the inlet port 23 to uncover a first incremental opening 81. By assuming that the gate 38 is rotating with a constant rotational velocity (or translating axially with a constant linear speed), the progressive nature of the combination of the round or arcuate inlet ports with the angled gate can be illustrated. As the gate 38 moves an additional increment in the direction of direction arrow 79 (in rotation), the side edge 76 is brought to a second position exposing a second incremental opening 82. Second incremental opening 82 is larger than first incremental opening 81. Likewise, as shown in FIG. 9-C, a third incremental opening 83 is subsequently uncovered, which is greater than second incremental opening 82. A progressively increasing enlargement of the aggregate opening continues in this manner until side edge 76 is halfway across the inlet port so that it bisects the port. At this point, from then on until the side edge 76 moves completely past the port, the incremental opening exposed by the side edge of the gate becomes smaller and smaller. Thus, as the gate traverses the inlet port, it uncovers increasing amounts of the port at a rate which, assuming the gate moves at constant speed, increases and then decreases sinusoidally. Of course, the same applies when the gate acts to cover the port by rotation, as well as when the gate covers or uncovers the port by translational movements along the axis 19.

Applicant has found that the combination of a gate with angled side edges and round inlet ports provides a beneficially progressive uncovering and covering of the ports when the piston assembly 35 is rotated, is moved in translation, and particularly both. The progressive operation of the gate in combination with the ports is particularly helpful for maintaining a desired air/combustible gas mixture when the piston 35 is moving back and forth axially as the apparatus attempts to equalize the air and gas supplied to the user to meet the user's present demand. The combination of round inlet ports and an angled gate has proven quite useful when used in a closed loop control system, providing a smoother change in the quality of the mixed gas when the actuator rotates the piston. Also, when full or maximum flow is needed, the round ports allow greater flow than square ports (square ports create vortices at the corners of the square). Thus, a smaller, less expensive mixing apparatus can be employed. If a smaller mixing apparatus is used, the smaller piston thereof is more easily and efficiently controlled by the actuator.

While the invention has been disclosed in a preferred form, it will be obvious to those skilled in the art that many modifications, additions, and deletions may be made therein without departing from the spirit and scope of the invention as set forth in the appended claims.

What is claimed is:

1. An apparatus for mixing fluids comprising:
a housing defining a mixing chamber and a piston chamber therein and having a first inlet chamber in fluid communication with said mixing chamber through a first, generally arcuate inlet port and a second inlet chamber in fluid communication with said mixing chamber through a second, generally arcuate inlet port;
valve means for controlling the flow of fluids from said inlet chambers through said inlet ports into said mixing chamber, said valve means comprising a valve element mounted in said mixing chamber for rotary movement about an axis therein and for axial movement along said axis for progressively covering and uncovering said inlet ports, said valve element defining first and second side edges, with at least one of said side edges being oriented at an angle with respect to said axis;
a piston movably mounted in said piston chamber in said housing, said piston dividing said piston chamber into first and second chambers, with said first chamber in fluid communication with one of said inlet chambers, and said second chamber in fluid communication with said mixing chamber, said piston mounted to said valve element for imparting axial movement to said valve element in response to differences in fluid pressure between within said one of said inlet chambers and within said mixing chamber; and
actuating means for rotating said valve element.

2. An apparatus as claimed in claim 1 wherein each of said first and second side edges are oriented at angle with respect to said axis.

3. An apparatus as claimed in claim 2 wherein said first and second side edges are each generally linear and lie in a common plane.

4. An apparatus as claimed in claim 1 wherein said first and second inlet ports are generally cylindrical.

5. An apparatus as claimed in claim 1 wherein said first and second inlet ports are circular.

6. An apparatus as claimed in claim 1 wherein said first and second inlet ports each are shaped as a circle projected onto the side of a cylinder.

7. An apparatus as claimed in claim 1 wherein said valve element comprises a piston stem attached to said piston, said piston stem including a cylindrical portion for covering both of said inlet ports simultaneously and a gate portion adapted for covering only one of said inlet ports at any one time, with said side edges of said valve element being formed on said gate portion.

8. An apparatus as claimed in claim 1 wherein said valve element comprises a piston stem attached to said piston and wherein said actuating means is coupled to said piston for rotating said piston.

9. An apparatus as claimed in claim 1 wherein said piston includes a piston stem extending into said mixing chamber and wherein a passageway is formed in said piston stem and said piston for communicating fluid pressure from said mixing chamber to said second chamber.

10. An apparatus as claimed in claim 1 further comprising resilient means for damping axial movement of said valve element.

11. An apparatus for mixing fluids comprising:
a housing defining a mixing chamber and a piston chamber therein and having a first inlet chamber in fluid communication with said mixing chamber through a first generally circular inlet port and a second inlet chamber in fluid communication with said mixing chamber through a second generally circular inlet port;
valve means for controlling the flow of fluids from said inlet chambers through said inlet ports into said mixing chamber, said valve means comprising a valve element mounted in said mixing chamber for rotary movement about an axis and for axial movement therein, wherein said valve element includes a cylindrical portion for covering both of said inlet ports simultaneously and a gate portion for selectively covering one of said inlet ports at a time, said gate portion defining angled side edges for progressively covering and uncovering said circular inlet ports;
a piston movably mounted in said piston chamber in said housing, said piston dividing said piston chamber into first and second chambers, said first chamber in fluid communication with one of said inlet chambers and said second chamber in fluid communication with said mixing chamber, said piston mounted to said valve element for imparting axial movement to said valve element within said mixing chamber in response to differences in fluid pressure between said one of said inlet chambers and said mixing chamber; and
actuating means for rotating said valve element.

12. An apparatus as claimed in claim 11 wherein said angled side edges are oriented at a common angle with respect to said axis.

13. An apparatus as claimed in claim 11 wherein said angled side edges are each generally linear and lie in a common plane.

14. An apparatus as claimed in claim 11 wherein said first and second inlets ports are generally shaped as the inersection of a first cylinder with a smaller second cylinder.

15. An apparatus as claimed in claim 11 wherein said valve element comprises a piston stem attached to said piston and wherein said actuating means is received in said piston for rotating said piston.

16. An apparatus as claimed in claim 11 wherein said piston includes a piston stem extending into said mixing chamber and wherein a passageway is formed in said piston, including said piston, for communicating fluid pressure from said mixing chamber to said second chamber.

17. An apparatus as claimed in claim 11 further comprising resilient means for damping axial movement of said valve element.

* * * * *